United States Patent [19]

Black et al.

[11] Patent Number: 4,968,325

[45] Date of Patent: Nov. 6, 1990

[54] FLUIDIZED BED GASIFIER

[75] Inventors: John W. Black, Markham; Guy Gravel, Riviere des Prairies; Raynald Hoareau, Brossard, all of Canada

[73] Assignee: Centre Quebecois de Valorisation de la Biomasse, Quebec, Canada

[21] Appl. No.: 88,384

[22] Filed: Aug. 24, 1987

[51] Int. Cl.$^5$ .............................................. C10J 3/56
[52] U.S. Cl. ........................................ 48/76; 48/77; 48/86 R; 48/111; 422/143; 422/145; 422/147
[58] Field of Search .................... 48/76, 63, 86 R, 111, 48/77, 209, 62 R; 422/139, 143, 145, 147

[56] References Cited

U.S. PATENT DOCUMENTS

| | | | |
|---|---|---|---|
| 2,838,063 | 6/1958 | Weits et al. | 422/139 |
| 2,901,331 | 8/1959 | Held et al. | 422/147 |
| 3,040,439 | 6/1962 | Frost | 422/143 |
| 3,043,657 | 7/1962 | Hughes et al. | 422/139 |
| 3,298,793 | 1/1967 | Mallisa et al. | 422/143 |
| 3,672,577 | 6/1972 | Kramer | 422/143 |
| 3,841,351 | 10/1974 | Kaiser | 48/14 |
| 3,853,498 | 12/1974 | Bailie . | |
| 3,933,445 | 1/1976 | Mueller et al. | 48/63 |
| 3,957,548 | 5/1976 | Squires | 48/63 |
| 4,218,222 | 8/1980 | Nolan et al. | 48/56 R |
| 4,246,231 | 1/1981 | Figler et al. | 422/147 |
| 4,321,877 | 3/1982 | Schmidt et al. | 48/63 |
| 4,443,551 | 4/1984 | Lionetti et al. | 422/143 |
| 4,592,762 | 6/1986 | Babu et al. . | |
| 4,721,514 | 1/1988 | Kikucli et al. | 48/203 |
| 4,725,409 | 2/1988 | Wolf | 422/147 |

FOREIGN PATENT DOCUMENTS

| | | | |
|---|---|---|---|
| 1058547 | 7/1979 | Canada . | |
| 2085748 | 5/1982 | United Kingdom | 422/139 |

OTHER PUBLICATIONS

Biomass Conversion Processes for Energy and Fuels, Samir S. Sofer, editor, University of Oklahoma, Plenum Press, New York (date not listed).
Biomass as a Nonfossil Fuel Source, Donald L. Klass, editor, Institute of Gas Technology, ACS Symposium, Washington, 1981.
Defibrator Bagasse Pulping Systems, Sweden (date not listed).
Gasification of Oak Sawdust, Mesquite, Corn Stover and Cotton Gin Trash in a Countercurrent Fluidized Bed Pilot Reactor, Steven R. Beck et al., Texas Tech. University, 1981.
Efficacité énergétique, Nouveler, Inc., Canada.

Primary Examiner—Peter Kratz
Attorney, Agent, or Firm—Bacon & Thomas

[57] ABSTRACT

There are disclosed a process and a plant for gasifying biomass. The plant has a pressure vessel containing a hot fluidized sand bed. The bio-mass is pre-dried to a moisture content of from 10% to 35% by weight. A steam-free oxygen-containing gas is fed and distributed, through a grid system at the bottom of the hot sand bed, to hold the bed in a fluidized state and to form, in its lower portion, an oxygen-rich heat-forming combustion zone and, in its upper portion, a hydrogen-rich gas-forming pyrolysis zone. The pre-dried biomass is uninterruptedly fed in the pyrolysis zone at essentially the center of the hot fluidized bed, this center being determined when the sand bed stands at rest. The fluidized bed is held at an operating temperature of 750° to 860° C. under an operating pressure of 400 kPa to 1750 kPa by controlling the feeding rate of the fluidized gas as well as the feeding rate of the biomass. The gases and biomass residue released from the hot fluidized bed are removed in a gas stream from the head space above the bed and sent to a primary cyclone which separates the useful gases from most of the biomass residue the latter being returned to the combustion zone of the bed. The gases and the biomass residue that have remained in the first cyclone are then moved into a second cyclone where the useful gases are collected and the biomass residue discarded.

12 Claims, 6 Drawing Sheets

FLUIDIZED BED GASIFIER

BACKGROUND OF THE INVENTION

1. Field of the Invention

The present invention relates to a process and to a plant for the gasification of biomass for production of fuel gases that may be used directly for combustion, in the case of low BTU gas, or be treated to form medium BTU substitute natural gas useful for industrial processes (for drying, steam production, space heating and lighting, conversion into electrical energy, etc). The invention constitutes also a solution to the waste disposal problem.

The term "biomass", as used in this description and the appended claims, includes solid wastes, peat, coal, wood residues such as wood chips and sawdust, organic and inorganic residues including solid and semi-solid carboneous materials as well as shale and cellulosic fibers.

Also, the expression "oxygen-containing gas" is to be understood to mean either air or enriched air or oxygen.

2. Description of the Prior Art

The Applicants are well aware that quite extensive research, development and experimental work has been made to convert waste material into fuel gas useful directly for combustion or for conversion into industrial process gases. A typical and very pertinent document, in this respect, is U.S. Pat. No. 4,592,762 of June 2nd. 1986. However, the process disclosed in this patent remains applicable only on an experimental stage as many parameters involved do not permit a large scale profitable operation. Thus, while it is said that the moisture content of the biomass may be reduced to 5% to 50%, it is added that if the reduction is from 5% to 40%, steam has to be added to the fluidized bed which, of course, produces a highly moist output gas which has to be more heavily treated either for direct combustion or for use in industrial processes in general. Additionally, the fluidized bed is fed, according to this patented process, intermittently which affects its efficiency and shows that the process is still in the experimental stage. Notable also is the fact that while the disclosure of the patent mentions feeding the biomass into the fluidized bed, the precise location where feeding is to be made is not given which, again, may be detrimental to the proper and efficient functioning of the bed.

In general, the literature known to the Applicants is unable to teach a process and disclose a plant suitable to produce low and medium BTU gases on an industrial scale, that is having a high yield of BTU gases recuperated at a relatively low cost.

SUMMARY OF THE INVENTION

The invention proposes a process and a plant to produce methanol and/or a low to medium BTU gas, which makes use of a fluidized bed gasifier using air or oxygen.

A specific fluidization grid is provided in the gasifier which allows a large range of gasification procedures, whatever be the feeding required to reach the fixed pressure and/or temperature, and which is protected during the preheat mode from overpressure, that is over 270 kPa.

The location of the biomass feed point is one over the more important gasifier design parameter and the following factors should be considered carefully.

To prevent local defluidization due to an increase in minimum fluidization velocity (Umf), the biomass concentration in the bed, particularly in the case of wood or similar matters, should be kept below 12%. Even at this value, if the system is operating in a zone of the bed where the superficial velocity (Uo) is close to Umf, for instance at the bottom of the bad, then the wood concentration should be kept to about 8%.

The rate of feed in volume of the biomass containing wood, particularly at high pressures, must be quickly dissipated into the reactor bed. According to the invention, the biomass flow is 12 T/Hr, at 20% moisture, which compares with a bed weight of 2.8 T. Thus to prevent fluidization problems, the biomass should be gasified within 1.6 minutes (1 minute for oxygen gasification) on assumption that the biomass is completely mixed with the bed. If not, then the gasification time should be shorter. The volume flow of the biomass is also a significant factor. At an assumed bulk density of 12 lbs/ft the volumetric flow is 37 ft$^3$/m which is twice the volume of the bottom section of the bed or half the total bed volume.

Biomass dissipation rates must be greater than the rate of biomass flow into a section of the bed otherwise the biomass will flood that section.

For example, it is assumed that Umf is=4 cm/sec, at operating conditions, then at twice Umf, the wood dissipation rate is 0.023 gm/cm$^2$/s=485 Kg/Hr. At 10 times Umf, the rate in the bed becomes equal to 4370 Kg/Hr or about half the requirement for normal oxy-gasifier-flow.

The temperature distribution within the bed must also be controlled so that hot spots do not develop and that heat produced in the combustion zone dissipates into the pyrolysis zone. Since the chemical reactions are not instantaneous, the biomass must be dissipated into the bed, otherwise, high local concentration and consequent defluidization will occur.

A pre-reaction stage requires a finite amount of time to drive the water from the fuel reaction and to bring the particle temperature to 400° C. where pyrolysis is initiated, the pre-reaction times being related to particle size or to the minimum particle dimension and moisture content. With small particles, this pre-reaction time is of the order of 5 to 10 seconds (chips require a greater interval before reaction, of about 1 minute).

Since the principal method of char conversion is oxidization, char oxidization is much slower than gas combustion at 800° C. To maximise char conversion, it is preferable that pyrolysis gases be absent from the combustion zone at the bottom section of the bed.

Tar is also produced in the reaction but is destroyed by reaction in the hot bed. Then, there is only a small increase in tar yield as pyrolysis takes place at the bottom zone of the bed (less than 10%).

The feed point has to be located well above the fluidization gas injection grid. Pyrolysis near the grid would result in very high local temperature since there already are dead zones in this area (any further defluidization would be detrimental and would very quickly be self compounding). In addition, the volume into which dissipation can occur would be very limited. Biomass introduced at ⅔ level, permit distribution both up and down. Biomass introduced at the bottom of the bed permit only dissipation vertically upwards, not downwards. So, introduction into the upper part of the bed encourages the oxidation of char and if any defluidization should occur in this region, it will not affect the performance of the remainder of the bed. It is also necessary to ensure that biomass be introduced in the area of maximum velocity to encourage rapid dissipation into the bed and to prevent problems of local defluidization.

The pyrolysis reaction takes time to occur and biomass will dissipate into the lower as well as upper section of the bed. Same pyrolysis will occur on the lower section with its concomitant increase in gas flow thus further increasing the rate of mixing (Uo - Umf) so that dissipation rates in this upper area will be 2-3 times greater than in a zone close to the distributor.

The feed rate must be controlled to permit the introduction of the biomass into the fluidized bed gasifier on a continuous basis so the feeder will automatically compensate for change in quantity, size, composition, moisture content.

In order to maintain a constant plug density of biomass, a pressure is applied to the plug which depends on the power used by the feeder motor. According to the invention, the compression screw provides a flow of biomass against a cone actuated by an air cylinder facing the feeder's pipe section which chokes the biomass, thus building a constant pressure against it and thereby causing the biomass to compress into a plug.

The process of the invention requires an automated and computerized system to ensure and to thoroughly monitor logging as well as processing of the data. The operation is monitored and controlled by process instruments and controllers. These instruments and controllers as well as recorders and math units are linked together by control loops. Each loop has a specific function some require the operator to manually adjust operating set points on the controllers, others have predetermined set points. Lack of operator attention can initiate automatic system shutdown if operating conditions exceed or fall below pre-determined set points. However, a few control loops are connected to recorders and alarms that inform the operator of operating and alarms conditions on a continuous basis.

The temperature in the fluidized bed is controlled by temperature control loop TIC that in turn set the flow of air (or oxygen) through the fluidized bed.

As a backup to the temperature control, high temperature alarms (TAH) and extra alarms (TAHH) will notify the operator and shutdown the gasifier if necessary (or in case of lack of action by the operator); low temperature alarm (TAL) and extra low alarm (TALL) will do the same on low temperatures.

Differential pressures (PDT) are measured and recorded along the gasifier at the following points: gasifier bed differential pressure (between the head space and the bottom of the fluidized bed); gasifier distributor differential (between the distributor header and fluidized bed) and gasifier lower bed differential pressure (between the bottom of the fluidized bed and the middle of the bed).

Gasifier pressure (PT) and alarm (PAH) are also measured and recorded.

During operation, the area within the gasifier separates into two zones: the fluidized bed portion and the head space. In the first portion, the biomass comes into intimate contact with the fluidized sand of the bed and is gasified. In the upper section, most of the heavier particles in motion (biomass and sand) disengage and fall back into the fluidized bed. The lightest fraction of airborne particles are carried over into the gas stream from the head space and are separated in the produced gas cleaning equipment known as "cyclone".

The material collected in the cyclone consisting mainly of fluid bed sand and unburned wood (char) are returned to the fluidized bed by a dip leg which has a check valve preventing back flow should the process fail one way or the other.

Specifically and in accordance with the invention, there is provided a process of gasification of biomass in a reaction vessel having a heated fluidized sand bed and a head space above said bed, comprising the steps of pre-drying the biomass to a moisture content of from 10 to 35% by weight; feeding and distributing steam-free oxygen-containing gas at the bottom of the bed to hold the bed in fluidized state and to form, in the lower portion thereof, an oxygen-rich heat forming combustion zone and, in the upper portion thereof, a hydrogen-rich gas-forming pyrolysis zone; feeding the pre-dried biomass uninterruptedly and fluid-tightly in the pyrolysis zone at essentially the center of the height of the bed, the center being determined when the bed stands at rest; holding the fluidized bed at an operating temperature of 750° C. to 860° C. under an operating pressure of 400 kPa to 1750 kPa by controlling the feeding rate of the oxygen-containing gas and the feeding rate of the biomass; removing ashes and biomass residue, released from the bed, in a gas stream from the head space; separating the removed gases from the removed biomass residue in a primary cyclone and feeding the biomass residue back into the bed, in the combustion zone; introducing gases and biomass residue, remaining in the primary cyclone, into a secondary cyclone; and collecting the gases from the secondary cyclone and discarding any remaining residue.

There is also provided, according to the invention, a plant for the gasification of biomass, comprising a reaction vessel; a hot fluidized bed of sand in the vessel, defining a head space thereover; biomass to be treated in the vessel, the biomass being pre-dried to a moisture content of from 10% to 35% by weight; means, at the bottom of the bed, feeding and distributing steam-free oxygen-containing gas suitable for holding the bed in fluidized state and for forming, in the lower portion of the bed an oxygen-rich heat-forming combustion zone and, in the upper portion thereof, a hydrogen-rich gas-forming pyrolysis zone; the means including tubular members defining orifices directed downwardly for preventing inflow of sand in the members; means uninterruptedly and fluid-tightly feeding the pre-dried biomass in the pyrolysis zone at essentially the center of the height of the bed; the center being determined when the bed stands at rest; wherein the oxygen-containing gas and the biomass are fed into the fluidized bed at rate selected to hold such fluidized bed at an operating temperature of 750° C. to 860° C. and a pressure of 400 kPa to 1750 kPa; a primary cyclone and first conduit means operatively interconnecting the bottom of said primary cyclone and the combustion zone of the fluidized bed; check valve means for preventing back flow from the bed into the first conduit means; second conduit means interconnecting the head space and the primary cyclone for guiding gases and biomass residue from the vessel head space into the primary cyclone; a secondary cyclone and third conduit means operatively interconnecting the primary and secondary cyclones for guiding gases and biomass residue, remaining in the primary cyclone, into the secondary cyclone.

A description of preferred embodiments of the invention now follows having reference to the appended drawings.

IN THE DRAWINGS

Figure 2:
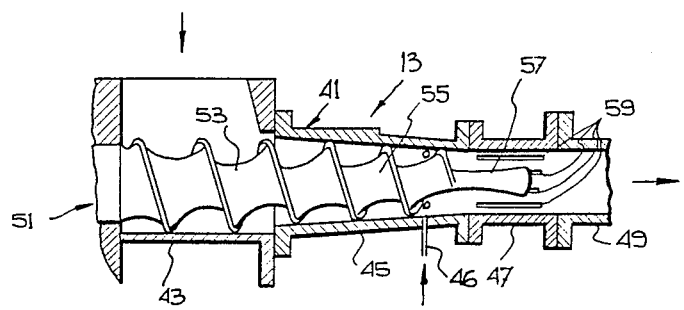
FIG. 2 is a longitudinal cross-sectional view of a compressor for feeding biomass into the fluidized bed.
Figure 4:
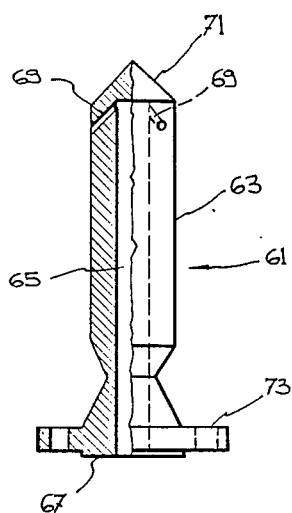
Figure 3:
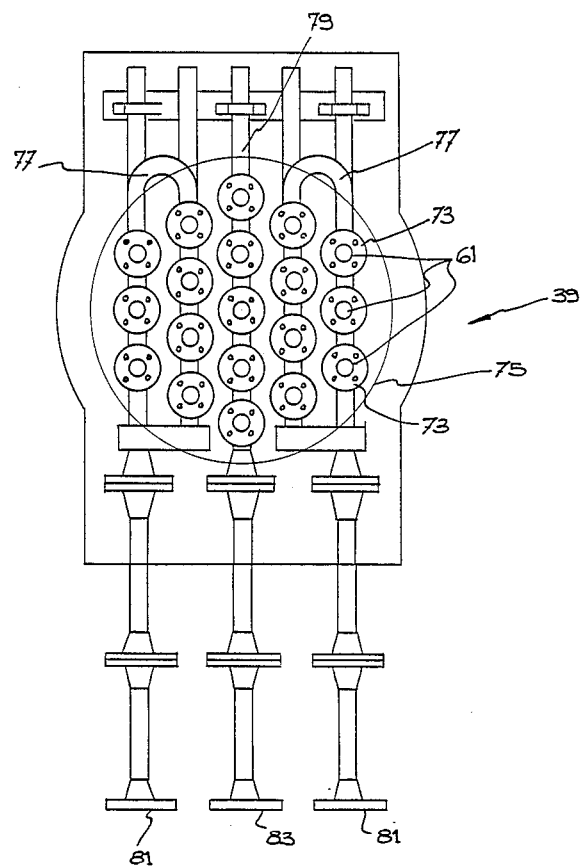
FIG. 3 is a top plan view of a grid feeding air into the fluidized bed.
Figure 5:
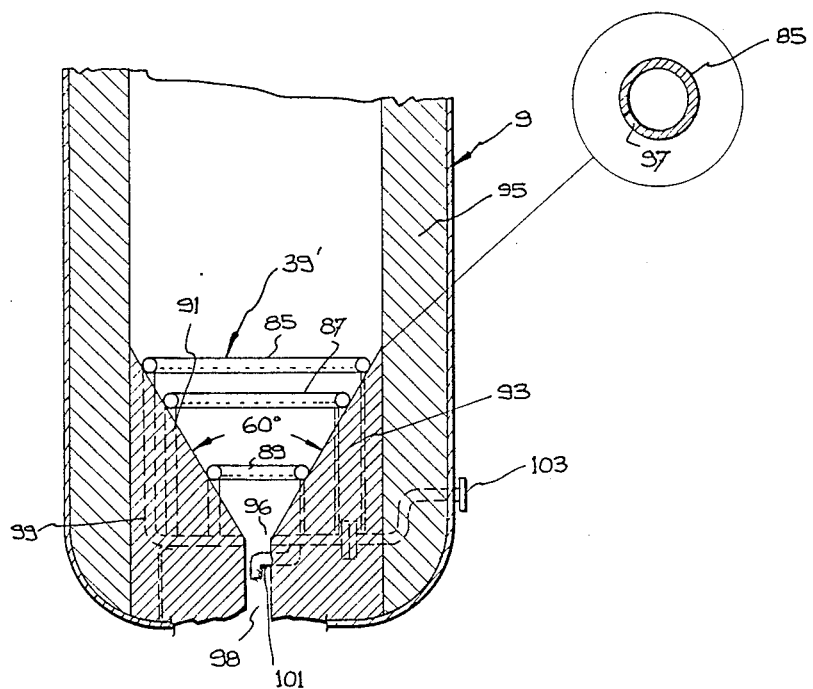
Figure 6:
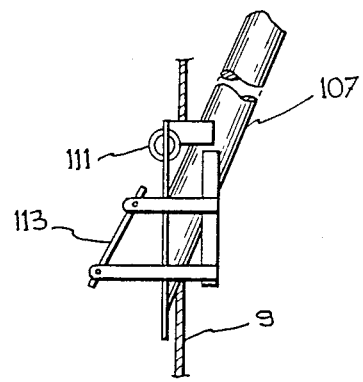
Figure 6A:
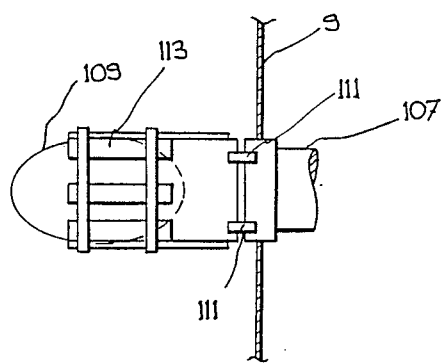
Figure 7:
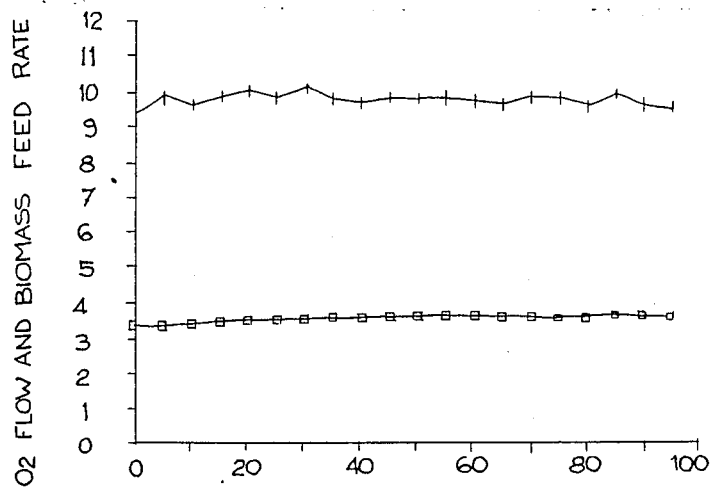
Figure 8:
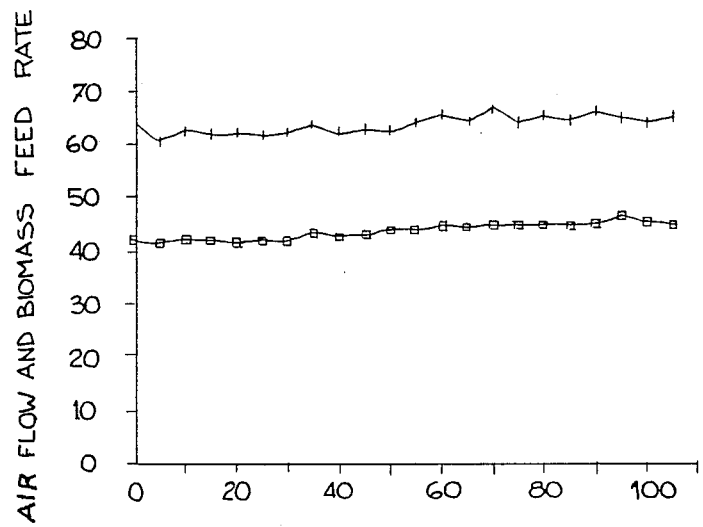

FIG. 4 appearing on the same sheet of drawings as FIG. 2, is a side view, half in cross-section, of an air ejector for the grid of FIG. 3;

FIG. 5 is a partial cross-sectional view of the lower part of the gasifier, using an oxygen grid for feeding into the bed;

FIG. 5a showing a detail;

FIGS. 6 and 6a are, respectively, a side elevation view and a top plan view of trickle valve for use in conjunction with and at the lower end of a discharge conduit of a first cyclone;

FIGS. 7 and 8 are curves relative to gasification with oxygen and air, respectively.

DESCRIPTION OF THE PREFERRED EMBODIMENTS

The gasification process utilizes a hot fluidized sand bed to convert the biomass and the oxygen-containing gas into a hot combustible gas.

The oxygen-containing gas is fed at the bottom of the gasifier vessel and flows through a grid and into a large bed of sand. The gas flow produces a bubbling action in the sand such that the appearance of the bed is almost like that of a gently boiling pot of water. Under such conditions, the sand bed behaves almost like a liquid or fluid in motion. Hence the bed may be described as being "fluidized".

When biomassis fed into the hot fluidized bed, it rapidly decomposes into a hot combustible gas. This process is known as "gasification". In other words, the gasification process can be summarized as follows:

The biomass comes into intimate contact with a bed of hot sand and an oxygen-containing gas;

a small fraction of pyrolyzed biomass burns due to the air, or oxygen, present and heat is released;

the remainder of the bio-mass is pyrolyzed, utilizing the heat released from the burning of the pyrolyzed biomass.

The process can be represented briefly by the following chemical reactions.

A first reaction in which a mixture of biomass and char with air or oxygen, in the high temperature bed causes a fire with a large amount of heat being released, this reaction being known as burning or combustion:

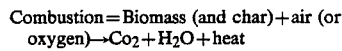

Combustion = Biomass (and char) + air (or oxygen) → $CO_2$ + $H_2O$ + heat

During the pyrolysis stage, this heat released from combustion is absorbed by the fluidized sand bed in intimate contact with the biomass. When these conditions are met, the biomass chars;

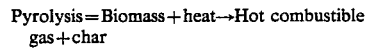

Pyrolysis = Biomass + heat → Hot combustible gas + char

The biomass char or carbon then reacts further with carbon dioxide or water vapour to provide more gaseous products;

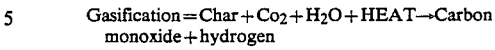

Gasification = Char + $CO_2$ + $H_2O$ + HEAT → Carbon monoxide + hydrogen

The operation of the fluidized bed gasifier, of the invention, is based on the knowledge that the heat necessary to sustain the pyrolysis and gasification reactions comes from the combustion reaction. The oxygen-containing gas is used to keep the combustion reaction going.

The gasifier, according to the invention, has been designed to operate under high pressure (1.9 MPA) and temperature (915° C.). It is a cylindrical vessel (h=46'×6'O.D.) with a dish bottom and top made of a steel shell with a 6" refractory lining and 5" internal insulation to protect the shell from the heat and minimize process heat losses.

The gasification of the biomass in the fluidized bed takes place in two stages: an endothermic pyrolysis reaction followed by an exothermic combustion reaction.

To minimize the production of tar, it is necessary to obtain a fast pyrolysis reaction which in turn necessitates a rapid rate of heat transfer to the biomass particles.

Thus, the fluidized bed performs two functions. It provides a medium in which rapid heat to the biomass particle can take place and, by adding an inert medium to the bed it ensures a controlled fluidization environment over a wide range of biomass feed rates. The latter is accomplished by diluting the biomass material with readily fluidizable sand.

The parameters that influence and limit the reactor's design, are for example, biomass concentration which is detrimental to fluidization quality above 6% and adverse above 12% of biomass mixed with sand (240 microns sand size) as well as specified velocity which upon increasing can improve mixing (biomass mixing rate) (Uo-Umf) and finally reactions which because of increasing gas flow can rearrange normal bed behaviour, subsequently. The manner in which these parameters influence and limit the design and also improve mixing, minimize the formation of local hot spots and improve the efficiency of char conversion. The reactor head space should preferably be located at about ⅓ the height of the vessel.

The parameters that affect the gasifier design include the pyrolysis which produces a large increase in the volume of gas present in the reactor by converting solid fuel into a fuel gas and oxidation which produces only a slight increase in gas volume. This changing volume tends to disrupt the normal patterns of mixing and fluidizability within the reactor.

The parameters that affect fluidizability are as follows. If the gas flowing upwards through a fine bed of solids is increased, it reaches a velocity known as the minimum fluidization velocity (Umf) which is just sufficient to support the particles, as a result of rag forces on the particles. Increase in the gas flow beyond this point lifts the particles and separates them very slightly. In fact, all of the gas flow in excess of that required to support the particles tends to form bubbles. If however the gas flow is distributed through high velocity jets at the bottom of the bed then the jets themselves tend to break off and form intermediate size bubbles in this zone. Particles underneath the bubbles tend to be "sucked" into the void created as the bubbles flow up through the bed. Thus, particles below the bubbles track the bubbles upward with a flow rate similar to the bubbles. It is this movement of the particles upward and sideways which imparts solids mixing into the bed. As the velocity is increased still further, the particles blow up the bed. This gas velocity (terminal velocity) is about 10 to 100 times the minimum fluidization velocity. A fluidized bed maintains good fluidizability over a wide range of gas velocity. At higher concentrations of biomass in the bed, the minimum fluidization velocity rapidly increases such that, at 12% of wood by weight Umf is 4 times that of sand.

It should be noted that minimum fluidization velocity will decrease with increasing temperature.

It should be noted that as the pressure is increased, the number and size of the bubbles decrease, thus reducing mixing and off-setting the temperature effect.

When the gasifier is operating at a velocity considerably in excess of Umf within the bed at pressure in the neighbourhood of 600 kPa, then a sudden increase to 800 kPa results in rapid defluidization of the bed.

Other parameters are factors affecting mixing. Solid mixing is affected by the passage of bubbles through the bed. Most of the mixing take place in the vertical direction. Because the bubbles also push the solids laterally, radial mixing does occur albeit at a much slower rate. The rate of mixing is also proportional to the bubble volume which, in turn, is proportional to the differential gas velocity, Uo - Umf. To obtain good mixing rates it is necessary to operate with ratios of Uo/Umf greater than 2(velocities less than this can cause stratification rather than mixing). Two such data points show the effect of superficial velocity on mixing rates.

| If sand size | = | 240 microns |
|---|---|---|
| Uo - Umf | | biomass mixing rate |
| (cm/s) | | (g/cm$^2$/s) |
| 4.5 | | .025 |
| 18 | | .103 |

Under normal conditions of gasification, cold fluidizing gas enters the bottom of the reactor where it is rapidly heated to the reactor conditions. This takes place within the first 10 cm of bed and it results in an almost four-fold increase in gas flow.

Other factors affecting gas flow are the pyrolysis and gasification reactions. In air gasifier, the pyrolysis reaction results in a doubling of gas flow while the gasification reactions do not significantly affect gas flow. In oxygen gasifier the pyrolysis reaction causes a six-fold increase in gas flow while the gasification reaction produces two-fold increase in reactant flow for a total increase of 7:1. Thus Uo - Umf changes significantly throughout the reactor as a result of temperature and reaction.

To resume, fluidization can occur with a wide range of gas velocities as 10:1 or higher. There are two restrictions which are imposed by the following factors.

In the case of distribution limitations, there are created by the need to provide a reasonable pressure drop to ensure even distribution of gas flow in the bed. The process of the invention incorporates a distributor pressure drop that is about 15 kPa.

If the entering gas velocity is increased, then the distributor pressure drop also increases but at the square of the velocity (for example: if the gas velocity is increased 10:1 as above, the distributor pressure drop would be increased by 100:1 or 1500 kPa which is not tolerable so, for this reason, the entering design gas velocity is restricted to a 3:1 ratio).

If the velocity in the cyclone is too low it will not create sufficient centrifugal force to separate the small particles. Velocities that are too high, tend to re-entrain the separated particles and also create very high abrasion rates. As a result, cyclone inlet velocities are usually maintained at a ratio of 2:1.

Thus, from a design stand point, the outlet gas velocity must be limited to a 3:1 ratio. It is not feasible therefore, to utilize the same distributor for both oxygen and air. Obviously, if cold oxygen is introduced into the bottom of the bed, then the volume of gas leaving at the top is 7 to 8 times as much as cold design flow and bed particles must be carefully fluidized during oxygen gasification.

Figure 1:
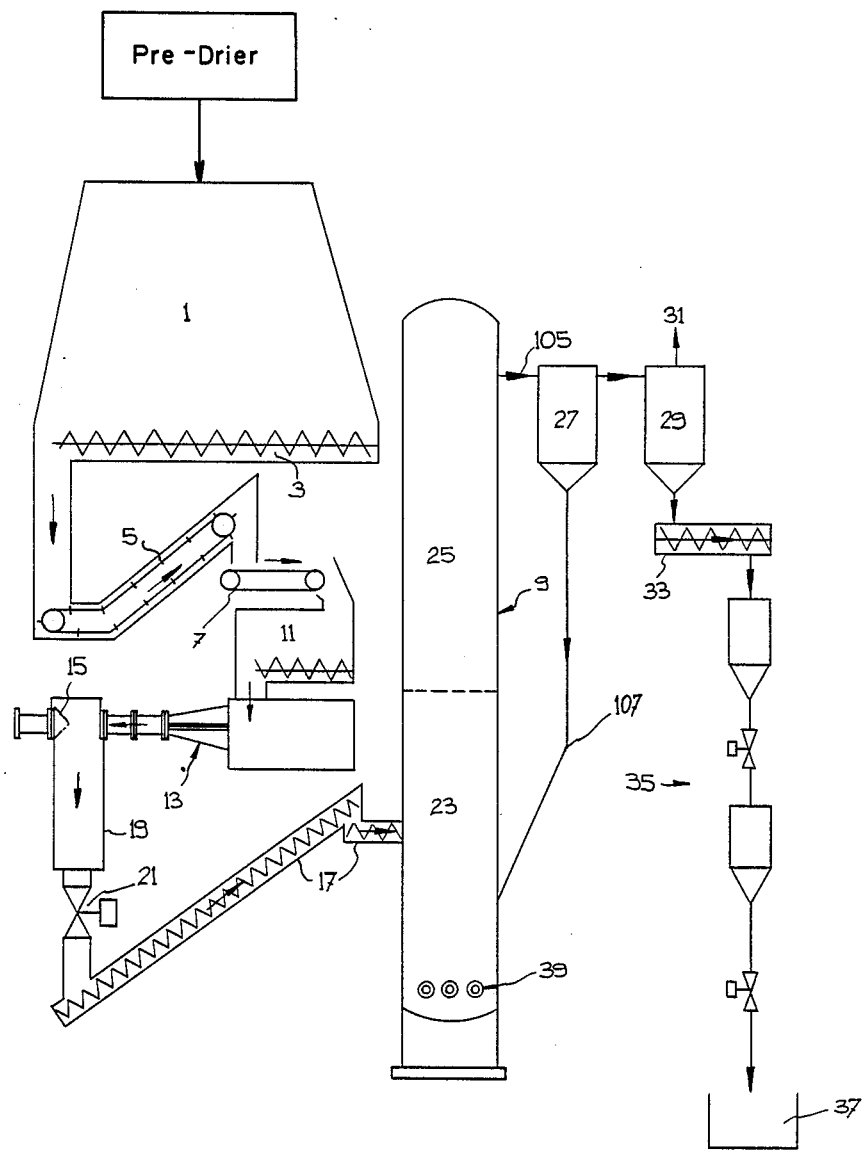
FIG. 1 is a flow chart of the operation of the process and illustrating the main components of a plant made to the invention.

The process according to a preferred embodiment of the invention is generally carried out as follows, having reference to FIG. 1.

Biomass is fed into a hopper 1, after being pre-dried, moved by a screw conveyor 3 over an inclined fleight conveyor 5 to be discharged over a weighing belt 7 suitable for controlling the biomass weight rate prior to feeding it into the gasifier vessel 9. The biomass then falls onto a screw conveyor 11 which feeds it into a plug feeder 13 which compresses the biomass to a pressure in excess of that in the vessel 9 to avoid backflow from the vessel. The plug feeder 13 includes a blow-back damper 15 suitable to shut off the outlet of the plug feeder, in case of failure of the latter to operate or in case of lack of biomass in the hopper 1. The bulk density of the plug is kept constant by a feedback motor amperage control. The controlled flow of biomass coming out of the plug feeder 13 falls into the conveyor assembly 17 through a conduit passage 19 provided with a shut-off valve 21 in case of malfunctioning of the blow-back damper 15. The pre-dried biomass is fed, from the conveyor assembly 17, directly at the center of the hot fluidized bed 23 formed in the lower portion of the gasifier vessel 9; the upper portion defining the head space 25 thereof. Gases, including light particles of char (completely burnt biomass), sand and various tar and biomass ashes, form a stream that passes from the head space 25 to a first cyclone 27 where most of the light particles are returned to the hot fluidized bed 23. The stream of useful gases along, along with some remaining lighter residues, mostly ashes, which have not been separated from the useful gases in the first cyclone 27, are brought into a second cyclone 29 where a second and final separation takes place; the clean useful gases being expelled and collected at 31 while the ashes are carried, by a screw conveyor 33, into a conventional lock hopper system 35 whence they are collected in an ash disposal container 37.

According to the invention, the biomass is predried to a moisture content of from 10% to 35% by weight. Steam-free oxygen-containing gas (oxygen or air as aforesaid) is fed and distributed through a grid system 39 at the bottom of the hot sand bed 23 to hold the bed in fluidized state and to form, in its lower portion, an oxygen-rich heat-forming combustion zone and, in its upper portion, a hydrogen-rich gas-forming pyrolysis zone. The pre-dried biomass is uninterruptedly fed in the pyrolysis zone at essentially the center of the height of the hot fluidized bed 23; this center being determined when the sand bed stands up at rest. The injection of biomass may take place, in practice, in an area of the pyrolysis zone comprised between ±20% of the height of the bed, relative to the bed center. The fluidized bed 23 is held at an operating temperature of 750° C. to 860° C. and at an operating pressure of 400 kPa to 1750 kPa by controlling the feeding rate of the fluidizing gas as well as the feeding rate of the biomass. The gases and biomass residues released from the hot fluidized bed 23, are removed in a gas stream from the head space 25 above the bed and sent to a primary cyclone 27 which separates the useful gases from most of the biomass residue; the latter being returned to the combustion zone of the fluidized bed 23. The gases and biomass residue that have remained in the first cyclone 27 are then moved into a second cycle 29 where the useful gases are collected and the biomass residue discarded.

The biomass should preferably be pre-dried to a moisture content of between 13% to 24%, ideally 15%.

As to the fluidized bed, it is best held at a temperature of between 820° C. and 830° C. while the pressure should preferably range between 435 kPa and 1720 kPa.

Appropriately, the granulometry of the sand of the bed 23 should preferably range from 100 to 400 μm while the volumetric ratio of air-to biomass, should preferably range from 1.25 to 1.35.

FIG. 2 shows the significant portion of the plug feeder 13 which serves as means for uninterruptedly and fluid-tightly feeding the pre-dried biomass in the pyrolysis zone of the fluidized bed 23 by strongly compacting the biomass at a pressure greater than that in the vessel 9 and by ensuring that the conduit passage 19 and the conveyor assembly 17 are constantly fully filled with compacted biomass. The plug feeder 13 has a hollow elongated conveyor body 41 comprising, in succession: a biomass cylindrical feeding section 43, a biomass conical compression section 45 in which the biomass is compressed, a compaction biomass plug-forming cylindrical section 47 and a biomass outlet section 49 serving also as a seat for the blow-back damper 15 (FIG. 1).

The compression section 45 may be provided with up to eight lubricant injections 46 regularly spaced apart all around the section 45 to inject oil, water or any similar lubricating substance between the inner wall of the plug feeder and the plug as such and thus reduce to a substantial extent the coefficient of friction between the biomass and the feeder surface (down to 0.06 to 0.10).

A rotary screw 51 is mounted in the body 41, having a cylindrical portion 53 in the biomass receiving feeding end section 43; a conical portion 55 in the compression section 45 where the biomass is first compressed and a plug-forming elongated nose 57 which projects into the plug-forming section 47 along a major portion thereof; nose 57 further flaring slightly outwardly, as shown, to allow the already compressed biomass to be highly compacted into a gas-tight plug discharging into the conduit passage 19 (FIG. 1) and conveyor assembly 17 to fill them up tightly so that continuous feeding of biomass into the fluidized bed, at a constant rate, is ensured so long as the screw 51 rotates.

Since the biomass, falling into the feed end section 43, is pre-dried and to prevent it from rotating when formed as a plug in the body section 47, the bore of the latter should be formed with lengthwise grooves 59 of any appropriate cross-section to receive material from the biomass plug and hold it stationary in spite of the screw 51.

Referring now to FIG. 3, there is shown an air grid system 39 (FIG. 1 also) used as a means for feeding and distributing steam-free air at the bottom of the fluidized bed 23. It comprises a plurality of nozzles 61, one being shown in detail in FIG. 4. Each nozzle has an upright hollow cylindrical body 63 defining a blind passage 65 opened at its bottom end 67 and formed with downwardly directed orifices 69 at the blind end 71; the inclination of the orifices 65 being preferably 45°. The blind end 71 should preferably be conical. With this arrangement, plugging of orifices 69 and passage 63 by sand from the bed 23 is avoided.

The lower ends of the nozzle 61 are formed with radial flanges 73 suitable for them to be removably fixed, as by bolts and nuts, to a circular base plate 75 made fast with the vessel 9 in any known manner (not shown). It is seen, from FIG. 3 that the nozzles are evenly and symmetrically distributed within the circular base plate 75, itself coaxial with the vessel 9. In FIG. 3, 2 U-shaped outer conduits 77 feed-air to the bottom open ends 67 of two sets of seven nozzles 61 each, while a central conduit 79 feeds air to five central nozzles. All conduits 77, 79 are appropriately fed from outside the vessel 9, as at 81, 83. As to the vessel, it may advantageously be provided with a refractory and insulating lining (not shown) to reduce heat losses.

FIGS. 5 and 5a show a preferred grid system 39' for use in feeding and distributing steam-free oxygen instead of air. As shown, the grid system comprises three horizontal hollow rings 85, 87, 89, spaced vertically from one another; their diameter decreasing from top to bottom such that their outer walls are tangent to a surface 91 defining an inverted cone of about 60°. In fact, this conical surface 91 is one defined by the center of a refractory plug 93 closing the bottom end of a cylindrical refractory lining 95 within the gasifier vessel 9. To be noted also is an oxygen inlet opening 96 at the apex of the plug 93. It may also serve as a drain 98 for the fluidized bed. Heat insulation material (not shown) should of course be inserted between the lining 95 and the vessel shell 9. All three rings, 85, 87, 89, are pierced with downwardly oxygen ejection orifices 97, best illustrated in FIG. 3a. inclined an angle of about 60° with respect to the vertical, that is toward the apex of the conical surface 91.

Oxygen is fed to the rings 85, 87, 89, by a conduit system 99, most of which is embedded in the refractory plug 93, having an auxiliary conduit 101 acting as a central injector and an inlet 103.

Returning to FIG. 1, and as mentioned previously, gases formed in the head space 25 gather in a stream sent to a first cyclone 27 by inlet conduit 105. The light particles separated from the gases in the cyclone 27 are returned to the combustion zone of the fluidized bed 23 by an outlet conduit 107 of which the lower end is connected to the vessel 9, as illustrated in FIGS. 6 and 6a. The lower end of the conduit 107 enters slightly into the vessel 9 and its opening is normally kept closed by a flap 109 hung to a pair of hingers 111 . The flap thus acts as a check valve preventing back flow of sand from the fluidized bed 23 into discharge conduit 107. It is restricted in its opening movement by an inclined open wall structure 113 fixed to vessel 9. FIG. 6a shows the flap 109 in fully opened condition and resting against to the structure 113.

Tests have been carried out by the applicants at St-Juste Breteniéres, Québec, Canada, in a plant including a gasifier vessel having 6' in diameter and 46' in height. The following operating conditions were applied:

| | |
|---|---|
| Temperature range | 750° C. to 860° C. |
| Pressure range | 400 kPa to 1750 kPa |
| Granulometry of sand | 100 to 400 μm |
| Volumetric ratio, | |
| fluidization air/biomass | 1.25 to 1.35 |
| oxygen/biomass | .25 to .35 |

The tests have given a useful gas production of 200 Nm$^3$ to 280 Nm$^3$ per minute and a carbon conversion of 97%.

By way of example, FIG. 7 shows the plotted curves of oxygen flow (upper curve) and biomass feed rate (lower curve), over time during a test where steam-free oxygen was used as fluidizing medium. The operating conditions were as follows:

| | |
|---|---|
| Rate of feed of biomass | 3590 kg/H |
| Moisture content of biomass | 24.0% |
| Oxygen flow rate | 9.8 Nm$^3$/Min. |
| Pressure of oxygen | 434 kPa abs. |
| Temperature of oxygen | 820° C. |

The results obtained were as follows:

| | |
|---|---|
| Rate of flow of wet gases | 72.0 Nm$^3$/Min. |
| Composition of dry gases | |
| Hydrogen | 20.2% |
| Carbon monoxyde | 30.35% |
| Carbon dioxyde | 31.82% |
| Nitrogen | 0.40% |
| Methane | 13.33% |
| Ethane | 1.57% |
| Ethylene | 2.25% |
| Argon + Oxygen | 0.00% |
| Other hycrocarbons | 0.08% |

FIG. 8 shows similar curves where air was used as gasification medium. The operating conditions were as follows:

| | |
|---|---|
| Rate of feed of biomass | 4300 kg/H. |
| Moisture content of biomass | 13.3% |
| Air flow rate | 62.9 Nm$^3$/Min |
| Air pressure | 721 kPa abs |
| Air temperature | 828° C. |

The results obtained were as follows:

| | |
|---|---|
| Rate of flow of wet gases | 137 Nm$^3$/Min |
| Composition of dry gases | |
| Hydrogen | 9.26% |
| Carbon monoxyde | 16.15% |
| Carbon dioxyde | 16.82% |
| Nitrogen | 49.06% |
| Methane | 7.58% |
| Ethane | 0.468% |
| Argon + Oxygen | 0.525% |
| Other hydrocarbons | 1.051% |

The embodiments of the invention in which an exclusive property or privilege is claimed are defined as follows:

1. In a plant for the gasification of biomass of the type comprising:
   a reaction vessel;
   a bed of sand in said vessel;
   means for feeding biomass as a given rate into said bed of said in said vessel;
   means at the bottom of said bed for feeding, at another given rate, and distributing through said bed an oxygen-containing gas under pressure to hold said bed in fluidized state while leaving a head space thereof in the vessel, said gas feeding means including tubular members having gas orifices directed downwardly for preventing in-flow of sand in said members;
   said reaction vessel and feeding means designed
      to allow the biomass to be quickly dissipated into the fluidized bed,
      to form an oxygen-rich, heat-forming combustion zone in the lower portion of said bed, and a hydrogen-rich gas-forming pyrolysis zone in the upper portion of said bed, and
      to hold the fluidized bed at an operating temperature of 750° to 860° C. by means of the heat formed in the combustion zone; and
   a primary cyclone interconnected to said reaction vessel to receive the gases and particles released from the fluidized bed and to separate the same, said primary cyclone having an inlet conduit in gas communication with the head space of said vessel, an outlet conduit and discharge conduit for the separated particles;
   wherein the improvement comprises:
      said plant also comprising drying means for pre-drying the biomass to a moisture content of from 10% to 35% by weight prior to feeding it into said fluidized bed;
      said sand bed having a height of sand when measured at rest and said means for feeding the biomass in the pyrolysis zone of the fluidized bed at a height within 20% of the total height of sand, when measured at rest, on either side of the center of the height of sand measured at rest;
      said means for feeding said biomass into said bed are fluid-tight and uninterrupted operating in order to provide continuous and constant introduction of biomass into said bed;
      said oxygen-containing gas feeding means is connected to a source of oxygen gas free of steam;
      said reaction vessel and feeding means are so adjusted as to keep the biomass concentration in the bed between 6% and 12% by weight and to hold the reaction vessel under an operating pressure of 400 kPa to 1,750 kPa;
      said discharge conduit of the primary cyclone has a discharge end opening into the reaction vessel and is adapted and positioned to allow the separated particles to return therethrough into the combustion zone of the fluidized bed;
      check valve means are provided for preventing back flow from the fluidized bed into said discharge conduit; and
      said plant further comprises a secondary cyclone interconnected to said primary cyclone to receive the gases and very light particles released from the primary cyclone through the outlet conduit of said primary cyclone and separate said very light particles from said gases prior to releasing said gases for subsequent use; wherein said means for feeding and distributing the steam-free oxygen-containing gas comprises: a plurality of horizontal hollow rings vertically spaced from one another, the diameters of said rings decreasing from the top to the bottom rings such that the outer walls of said rings are tangent to a surface defining an inverted cone, said rings being pierced with said downwardly directed gas orifices, and means for feeding said oxygen-containing gas to said rings; and wherein said vessel has a refractory lining with a refractory plug at the bottom thereof defining said inverted cone, said feeding means being embedded in said plug.

2. A plant as claimed in claim 1, wherein said drying means is adapted to pre-dry said biomass to a moisture content of between 13% and 24%.

3. A plant as claimed in claim 1, wherein said drying means is adapted to pre-dry said biomass to a moisture content of about 15%.

4. A plant as claimed in claim 1, wherein said means for controlling said feeding rates of gas and biomass are adapted to hold said fluidized bed at an operating temperature of 820° to 830° C. under a pressure of 435 kPa to 720 kPa.

5. A plant as claimed in claim 1, wherein said bed in said reaction vessel is made of sand whose granulometry ranges from 100 um to 400 um.

6. A plant as claimed in claim 5, wherein said means for controlling said gas and biomass feeding rates is adapted to provide a volumeric ratio of oxygen-containing gas/biomass which ranges from 1.25 to 1.35.

7. A plant as claimed in claim 1, wherein said vessel has a refractory lining at least in the area of said fluidized bed and of said feeding and distributing means.

8. A plant as claimed in claim 1, wherein said means for feeding said biomass in said fluidized bed comprise:

a hollow elongated conveyor body having, successively, a biomass feeding end section, a conical biomass compression section, a compaction biomass plug-forming section and a biomass outlet section; and a rotary screw mounted in said hollow body; said screw having a cylindrical portion in said feeding end section, a conical portion in said body conical section and a plug-forming elongated nose projecting into said plug-forming section along a measure portion thereof;

wherein said nose flares slightly outwardly and extends in the direction of said biomass outlet portion to make said biomass feeding means fully gas-tight.

9. A plant as claimed in claim 8, wherein said compression section is provided with means regularly spaced apart all around said compression section for injecting therein a lubricant and thus reducing to a substantial extent the coefficient of friction of the biomass in said compression and plug-forming sections, and wherein said plug-forming section has a bore formed with lengthwise grooves for preventing rotation of said biomass plug formed in said plug-forming section.

10. A plant as claimed in claim 1, wherein said check valve means comprise a flap closure and means biasing said flap closure against said discharge end of the discharge conduit of said primary cyclone.

11. A plant as claimed in claim 1, wherein said sand bed has, at rest, a predetermined height and said biomass is fed at the center of said bed.

12. A plant as claimed in claim 4, wherein said sand bed has, at rest, a predetermined height and said biomass is fed at the center of said bed.

* * * * *